United States Patent (10) Patent No.: US 8,453,001 B2
Fan et al. (45) Date of Patent: May 28, 2013

(54) METHOD FOR DETERMINING SWITCHING OF SLEEP MODE, COMPUTER PROGRAM PRODUCT FOR PERFORMING THE METHOD, AND RECORDING MEDIUM FOR THE COMPUTER PROGRAM PRODUCT

(75) Inventors: Yi-Hsuan Fan, Hsinchu County (TW); Yu-Min Chiu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 535 days.

(21) Appl. No.: 12/481,582

(22) Filed: Jun. 10, 2009

(65) Prior Publication Data

US 2010/0235666 A1 Sep. 16, 2010

(30) Foreign Application Priority Data

Mar. 12, 2009 (TW) ................................ 98108046 A

(51) Int. Cl.
*G06F 1/00* (2006.01)
*G06F 1/26* (2006.01)
*G06F 1/32* (2006.01)

(52) U.S. Cl.
CPC ................ *G06F 1/32* (2013.01); *G06F 1/3203* (2013.01); *G06F 1/3206* (2013.01); *G06F 1/3209* (2013.01); *Y02B 60/1214* (2013.01)
USPC ............................ 713/323; 713/300; 713/320

(58) Field of Classification Search
CPC ......... G06F 1/32; G06F 1/3203; G06F 1/3206; G06F 1/3209; Y02B 60/1214
USPC .......................................... 713/300, 320, 323
See application file for complete search history.

(56) References Cited

U.S. PATENT DOCUMENTS 4,498,057 A * 2/1985 Noro ............................. 330/297
6,397,053 B1 * 5/2002 Ghiazza ...................... 455/343.1
(Continued)

FOREIGN PATENT DOCUMENTS

EP 1954078 A1 * 8/2008
JP 03210617 A * 9/1991
(Continued)

OTHER PUBLICATIONS

Chung-Hsien Hsu; Kai-Ten Feng; Chung-Ju Chang; , "Flexible Window Adjustment Approach for IEEE 802.16m Sleep Mode Operation," Global Telecommunications Conference (GLOBECOM 2011), 2011 IEEE , pp. 1-5, Dec. 5-9, 2011.*

(Continued)

*Primary Examiner* — Faisal M Zaman
(74) *Attorney, Agent, or Firm* — Jianq Chyun IP Office

(57) ABSTRACT

A method for determining switching of the sleep mode for a device is provided. The device and a base station have several connections therebetween. In the determining method, one of the connections is first provided and it is determined whether the connection is realtime or non-realtime. It is then determined whether or not the realtime and non-realtime connections satisfy the condition for entering the sleep mode according to a first condition and a second condition, respectively. If the connection does not satisfy the condition for entering the sleep mode, the device enters the normal mode. If the connection satisfies the condition for entering the sleep mode, then the foregoing steps are repeated till the connections have all been checked. If all of the connections satisfy the condition for entering the sleep mode, the device enters the sleep mode.

16 Claims, 4 Drawing Sheets

U.S. PATENT DOCUMENTS

| | | | |
|---|---|---|---|
| 6,747,976 B1 * | 6/2004 | Bensaou et al. | 370/395.4 |
| 7,346,361 B2 | 3/2008 | Kang et al. | |
| 8,271,658 B1 * | 9/2012 | Allred et al. | 709/227 |
| 2002/0105906 A1 * | 8/2002 | Marjelund et al. | 370/229 |
| 2005/0208899 A1 * | 9/2005 | Hanabusa | 455/69 |
| 2006/0034252 A1 * | 2/2006 | Karaoguz et al. | 370/351 |
| 2006/0111134 A1 * | 5/2006 | Mills | 455/518 |
| 2006/0135150 A1 * | 6/2006 | Oh | 455/425 |
| 2007/0109972 A1 * | 5/2007 | MacDonald | 370/252 |
| 2007/0147341 A1 * | 6/2007 | Izumikawa et al. | 370/351 |
| 2007/0182998 A1 * | 8/2007 | Okada | 358/400 |
| 2008/0157956 A1 * | 7/2008 | Radivojevic et al. | 340/531 |
| 2008/0261663 A1 * | 10/2008 | Park et al. | 455/574 |
| 2009/0209223 A1 * | 8/2009 | Kone et al. | 455/343.1 |
| 2009/0239574 A1 * | 9/2009 | Hussain | 455/552.1 |
| 2009/0296617 A1 * | 12/2009 | Lin et al. | 370/311 |
| 2009/0325533 A1 * | 12/2009 | Lele et al. | 455/343.1 |
| 2010/0208636 A1 * | 8/2010 | Kim et al. | 370/311 |
| 2010/0323647 A1 * | 12/2010 | Ryu et al. | 455/127.5 |
| 2011/0002253 A1 * | 1/2011 | Cha et al. | 370/311 |
| 2012/0188922 A1 * | 7/2012 | Le et al. | 370/311 |

FOREIGN PATENT DOCUMENTS

| | | | |
|---|---|---|---|
| JP | 07281909 A | * | 10/1995 |
| JP | 2002353869 A | * | 12/2002 |
| JP | 2004320237 A | * | 11/2004 |
| JP | 2006251860 A | * | 9/2006 |
| WO | WO 2009158163 A2 | * | 12/2009 |

OTHER PUBLICATIONS

Chien-Yu Wu; Hann-Jang Ho; SingLing Lee; , "Energy saving with multi-connections over IEEE 802.16e networks," Consumer Electronics, Communications and Networks (CECNet), 2011 International Conference on , pp. 4055-4058, Apr. 16-18, 2011.*

Tavli, B.; Heinzelman, W.B.; , "Energy and Spatial Reuse Efficient Network-Wide Real-Time Data Broadcasting in Mobile Ad Hoc Networks," Mobile Computing, IEEE Transactions on , vol. 5, No. 10, pp. 1297-1312, Oct. 2006.*

Al Noorani, S.H.; Ahmed, R.E.; Landolsi, T.; , "Energy-aware QoS uplink scheduling for UGS traffic services in WiMAX," Wireless Days (WD), 2011 IFIP , pp. 1-6, Oct. 10-12, 2011.*

* cited by examiner

METHOD FOR DETERMINING SWITCHING OF SLEEP MODE, COMPUTER PROGRAM PRODUCT FOR PERFORMING THE METHOD, AND RECORDING MEDIUM FOR THE COMPUTER PROGRAM PRODUCT

CROSS-REFERENCE TO RELATED APPLICATION

This application claims the priority benefit of Taiwan application serial no. 98108046, filed Mar. 12, 2009. The entirety of the above-mentioned patent application is hereby incorporated by reference herein and made a part of specification.

BACKGROUND

1. Technical Field

The disclosure relates generally to a method for determining switching of a sleep mode.

2. Description of Related Art

The world interoperability for microwave access (WiMAX) is a new generation of city wireless broadband network, which provides a sleep mode for the power management of the user end. When the user end wants to enter the sleep mode, a request message must first be transmitted to the server end to establish and activate a power saving class (PSC). The PSC is comprised of a group of connections having similar transmission requirement characteristics and one PSC may contain one or more connections. Upon receiving the request message, the server end returns a replay message to the user end, informing that whether or not the server end allows the user end to enter the sleep mode. If the server end allows, then the user end may switch to the sleep mode. Likewise, if the user end wants to leave the sleep mode, the switching is done through message transmission between both parties.

Because the user end entering the sleep mode needs not to operate as in the normal mode, the user end can temporarily shut off some unused hardware modules and reduce the waste of network resources thus effectively increasing the use time of the portable device and network performance. As a standard for WiMAX, IEEE 802.16e specifies only message transmission relating to the sleep mode. However, IEEE 802.16e does not clearly specify the conditions for entering and leaving the sleep mode, which provides a room for the manufacturers to define these conditions by themselves.

FIG. 1 illustrates a conventional determining method for switching of the sleep mode. Referring to FIG. 1, in the conventional determining method, it is first determined whether there is data to be transmitted in the basic queue (step S102). If there is data to be transmitted in the basic queue, then the user end enters a normal mode (step S104); if not, it is determined whether there is data to be transmitted in the primary queue (step S106). If there is data to be transmitted in the primary queue, the user end enters the normal mode (step S104); if not, then it is determined whether there is data to be transmitted in the data queue (step S108). If there is data to be transmitted in the data queue, then the user enters the normal mode (step S104); if not, the user end enters the sleep mode (step S110).

The conventional determining method is performed such that whether to enter the sleep mode is determined based on whether there is data to be transmitted in the queues. Thus, the user end can enter the sleep mode during the intervals when there is no data to be translated in the queue.

SUMMARY

One exemplary embodiment consistent with the present invention provides a method for determining switching of a sleep mode for a device. The device and a base station have at least one connection therebetween. In the determining method, one of a plurality of connections is first provided. It is then determined whether the connection is realtime or non-realtime. If the connection is realtime, then it is determined whether or not the connection satisfies the condition for entering the sleep mode based on a first condition. If the connection is non-realtime, then it is determined whether or not the connection satisfies the condition for entering the sleep mode based on a second condition. The device enters a normal mode if the connection does not satisfy the condition for entering the sleep mode. If the connection satisfies the condition for entering the sleep mode, the foregoing steps are repeated till the connections have all been checked. The device enters the sleep mode if all of the connections satisfy the condition for entering the sleep mode.

In order to make the aforementioned and other features and advantages of the present invention more comprehensible, embodiments accompanied with figures are described in detail below.

DESCRIPTION OF THE EMBODIMENTS

One exemplary embodiment consistent with the present invention provides a method for determining switching of a sleep mode, which can prolong the sleep time of a device thus reducing the power consumption.

Another exemplary embodiment consistent with the present invention provides a computer program product which can perform a method for determining switching of a sleep mode.

A further exemplary embodiment consistent with the present invention provides a readable recording medium which can record a program for performing a method for determining switching of a sleep mode.

Figure 1:
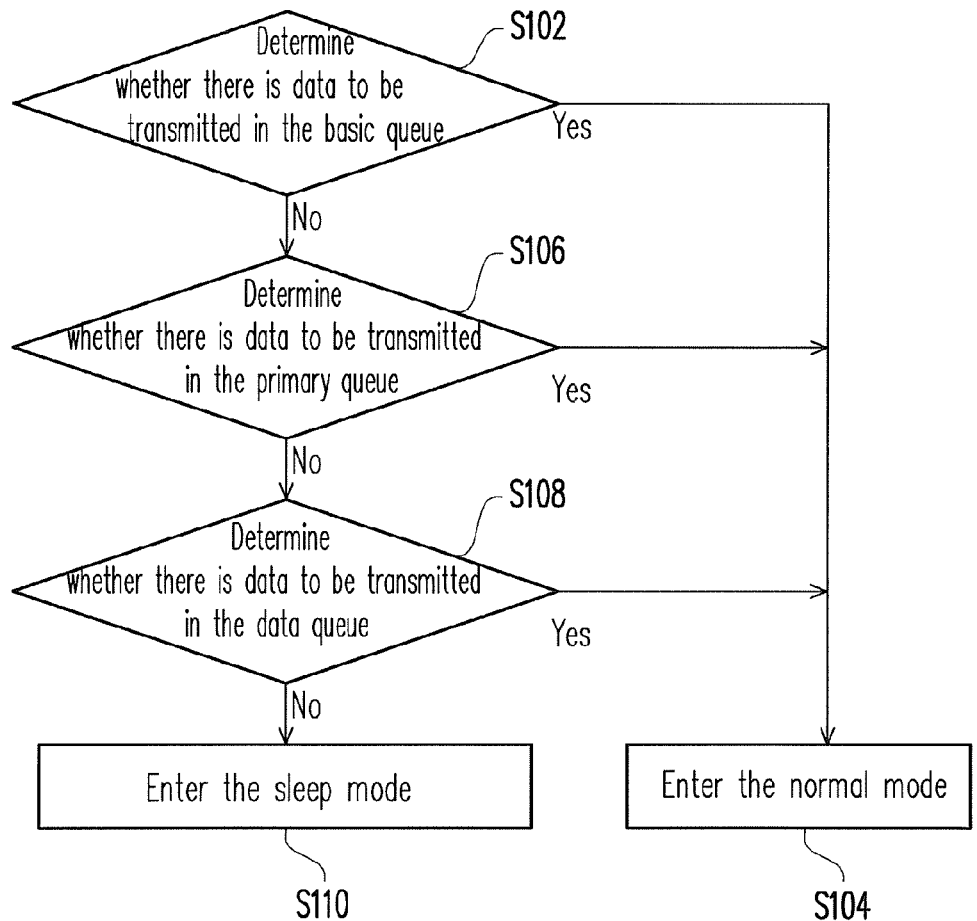
FIG. 1 illustrates a conventional method for determining switching of a sleep mode.
Figure 2:
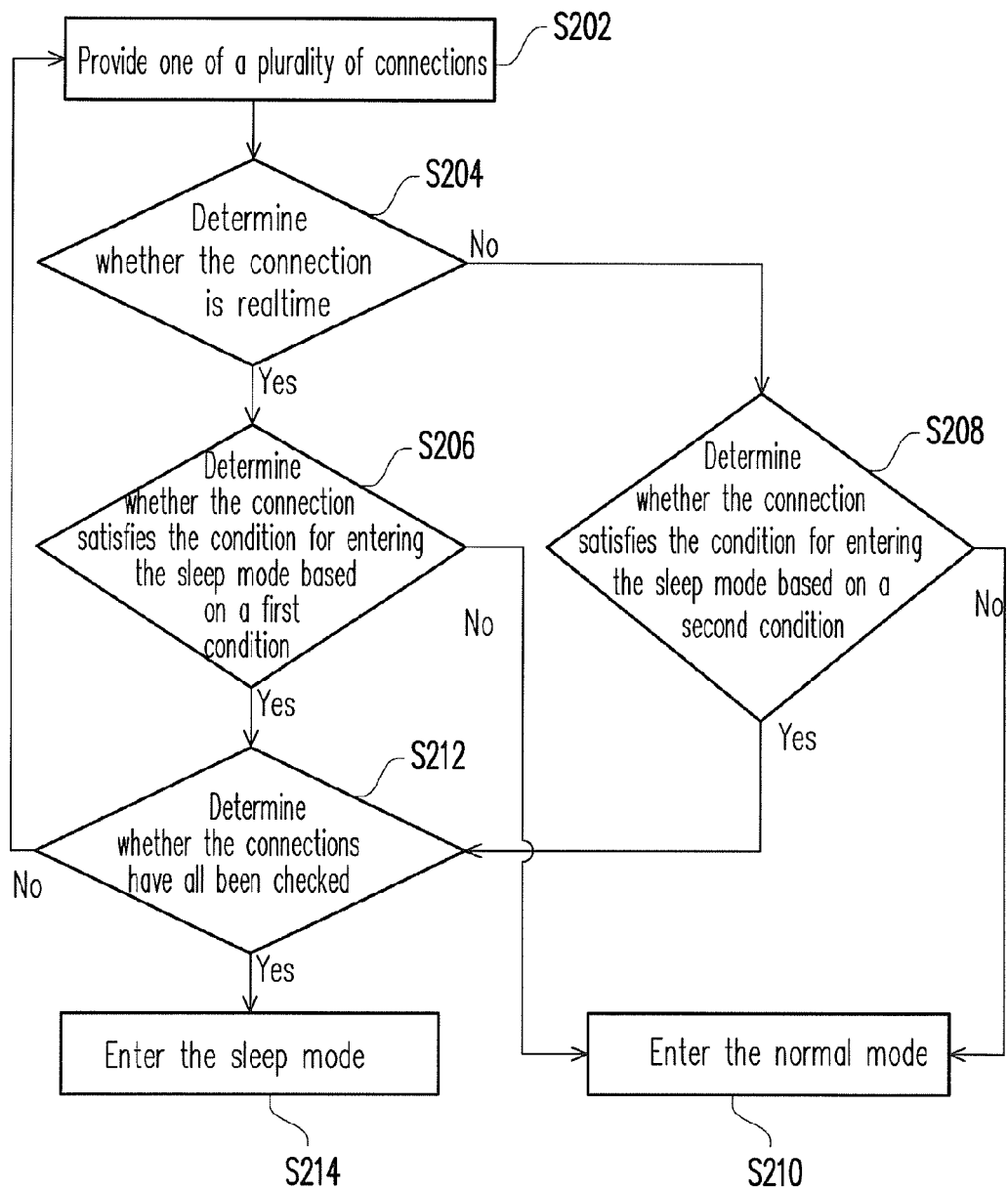
FIG. 2 is a flow chart of a method for determining switching of a sleep mode according to one exemplary embodiment consistent with the present invention.

FIG. 2 is a flow chart of a method for determining switching of a sleep mode according to one exemplary embodiment consistent with the present invention. The determining method of the present embodiment is suitable for a device such as a portable device or a mobile phone. The device is a wireless accessible (e.g., worldwide interoperability for microwave access (WiMax) or 4G) user end, which has at least one connection with the base station. The device includes a computer readable recording medium which stores therein a computer program for performing the determining method for switching of the sleep mode. The flow of the determining method is explained below step by step with reference to FIG. 2.

Firstly, one of a plurality of connections between the device and the base station is provided (step S202). It is then determined whether or not the connection is realtime (step S204). If the connection is realtime, a first condition is then used to determine whether the connection satisfies the condition for entering the sleep mode (step S206). If the connection is non-realtime, a second condition is then used to determine whether the connection satisfies the condition for entering the sleep mode (step S208). If the connection does not satisfy the condition for entering the sleep mode, the device enters a normal mode (step S210). If the connection satisfies the condition for entering the sleep mode, it is then determined whether or not the connections have all been checked (step S212). If the connections have all been checked, the device then enters the sleep mode (step S214). If not, the determining method returns to step S202 to continue checking of other connections.

In some embodiments, the determination in steps S210 and S214 can be made in a more precise manner such that, for example, the device switches to the normal mode (step S210) only when the device is in the sleep mode. The device switches to the sleep mode (step S214) only when the device is in the normal mode.

Figure 3A:
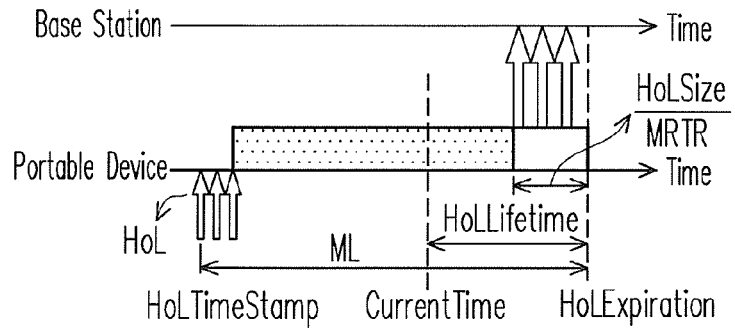
FIG. 3A to FIG. 3C illustrate packet transmission according to one exemplary embodiment consistent with the present invention.
Figure 3B:
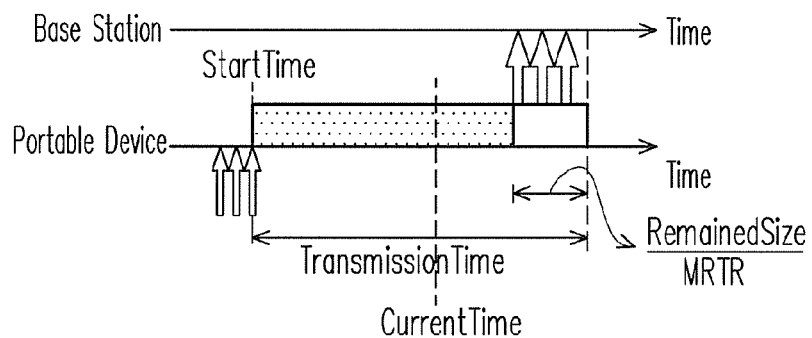
Figure 3C:
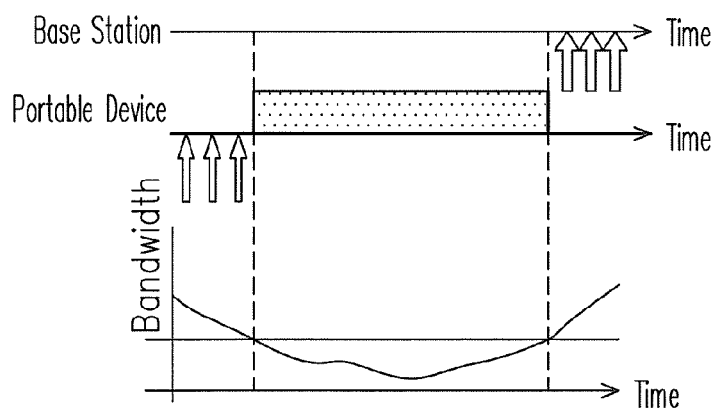

FIG. 3A to FIG. 3C illustrate packet transmission according to one exemplary embodiment consistent with the present invention. Below, the equation for the first condition is explained with reference to FIG. 3A and the equations for the second condition are explained with reference to FIG. 3B and FIG. 3C. In FIGS. 3A to 3C, an upward arrow represents a packet transmitted between the portable device and the base station, a strip with a dot pattern represents the time during which the portable device can be in the sleep mode, and a white strip represents a maximum time needed for the packet transmission.

Referring first to FIG. 3A, in the case of a realtime connection which has set an expiration for the data packet, the packet must be transmitted to the server end before the maximum latency (ML) expires, or the packet will be discarded. Therefore, in considering a remaining time for each packet, as long as there is enough sleep time before the data expires and is discarded, the connection can be allowed to enter or remain in the sleep mode. To accelerate the determination, the determination is made directly based on a head-of-line (HoL) packet (the first packet) of a queue of the connection.

In order to timely transmit the HoL packet before the expiration of the HoL packet (HoLExpiration), the remaining time for the HoL packet (HoLLifetime) must be first calculated. The remaining time for the HoL packet can be calculated by subtracting a current time (CurrentTime) from a sum of the max latency for the connection and a time stamp of the HoL packet (HoLTimeStamp). Accordingly, the remaining time for the HoL packet can be calculated according to the following equation:

$$HoLLifetime = HoLTimeStamp + ML - CurrentTime$$

Next, the remaining time is subtracted by a maximum transmission time for the HoL packet and further subtracted by a jitter. If the calculated result is greater than a determining period (Polling), the connection is then considered satisfying the condition for entering the sleep mode. The maximum transmission time is calculated based on a size of the HoL packet (HoLSize) and a minimum reserved traffic rate (MRTR) granted to the portable device by the base station. For example, the maximum transmission time for the HoL packet can be obtained as a result of the size of the HoL packet divided by MRTR granted to the portable device by the base station. The jitter is the latency variance in transmitting the packet from the portable device to the base station. Therefore, the first condition in step S206 can be expressed by the following equation:

$$HoLLifetime - HoLSize/MRTR - Jitter \geq Polling$$

Referring now to FIG. 3B, in the case of non-realtime connection, what the user cares about is the overall data transmission time (TransmissionTime) which must be maintained within a certain limit, or the user will be impatient. Therefore, in considering a data transmission rate, as long as the transmission rate is greater than an average rate (AverageRate) of the portable device during a recent period of time and there is enough sleep time, the user end can then be allowed to enter or remain in the sleep mode.

In order to maintain the transmission rate above the average rate, the transmission time for the overall data to be transmitted must first be calculated. The transmission time for the overall data to be transmitted may be determined based on a total size (TotalSize) of the overall data to be transmitted in the queue of the connection at a preset start time (StartTime) and a size of the remaining data (RemainedSize) to be transmitted in the queue of the connection at a current time (CurrentTime). The start time is prior to the current time.

In particular, the average transmission time for the overall data to be transmitted and the maximum transmission time for the remaining data to be transmitted can be calculated first. The average transmission time can be calculated based on the size of the overall data to be transmitted and the average transmission rate. For example, the average transmission time can be obtained as a result of the size of the overall data to be transmitted divided by the average transmission rate. In addition, the maximum transmission time can be calculated based on the size of the remaining data to be transmitted and the MRTR granted to the portable device by the base station. For example, the maximum transmission time can be obtained as a result of the size of the overall data to be transmitted divided by the MRTR granted to the portable device by the base station.

If the result of subtracting the current time and further subtracting the maximum transmission time for the remaining data to be transmitted from a sum of the start time and the average transmission time for the overall data to be transmitted is greater than a determining period (Polling), the connection is then considered satisfying the condition for entering the sleep mode. Therefore, the condition in step S208 can be expressed by the following equation:

$$StartTime + TotalSize/AverageRate - CurrentTime - RemainedSize/MRTR \geq Polling$$

Referring now to FIG. 3C, with respect to the non-realtime connection, in addition to considering the overall data transmission time, the present embodiment also determines whether to enter the sleep mode based on a granted bandwidth of the portable device. For example, when a recent bandwidth (CurrentBand) granted by the base station is smaller than a threshold due to increase in the number of users, poor connection quality or other factors, the portable device can be allowed to enter the sleep mode. The threshold can be a preset constant (ConstantRate) (e.g., the preset constant is 5 kbps), an average transmission rage (AverageRate) of the portable device during a preset time period (e.g., the average transmission rate of the portable device during recent one minute is 7 kbps), or an average value (AverageBand) of a preset number of recent bandwidths granted to the portable device by the base station (e.g., the average value of recent five bandwidths granted to the portable device by the base station is 10 kbps). Therefore, the second condition in step S208 may also be expressed by the following equations:

CurrentBand≦ConstantRate, or

CurrentBand≦AverageRate, or

CurrentBand≦AverageBand

In addition to the comparison with the threshold, the present embodiment can also determine whether to enter the sleep mode based on a gradual decrease of a preset number of recent bandwidths granted to the portable device by the base station. For example, when recent five bandwidths granted to the portable device by the base station gradually decrease, the portable device is then considered satisfying the condition for entering the sleep mode.

In summary, with respect to the second condition for entering the sleep mode in step S208, it may be whether the transmission rate is greater than the average rate of the portable device during a preset recent time period and whether there is enough sleep time. In addition, whether the condition for entering the sleep mode is satisfied can be determined based on the bandwidth granted to the portable device. It is to be noted that the second conditions in both cases mentioned above can be considered at the same time to determine whether to allow the portable device to enter the sleep mode. If the second condition in either case is satisfied, the current connection is then considered satisfying the condition for entering the sleep mode.

In addition, when the portable device is in the normal mode, the portable device can activate a polling for periodically determining whether to enter the sleep mode. The portable device performs steps S202 to S214 every determining period to check whether to enter the sleep mode. If the checking result is yes, the portable device then enters the sleep mode; if not, the portable device waits for the next determining period. Likewise, when the portable device is in the sleep mode, the portable device can also activate a polling for periodically determining whether to leave the sleep mode. The portable device performs steps S202 to S214 every determining period to check whether to leave the sleep mode. If the checking result is yes, the portable device then leaves the sleep mode; if not, the portable device waits for a next determining period. It is to be noted that the determining period for entering the sleep mode is usually greater than the determining period for leaving the sleep mode.

Figure 4:
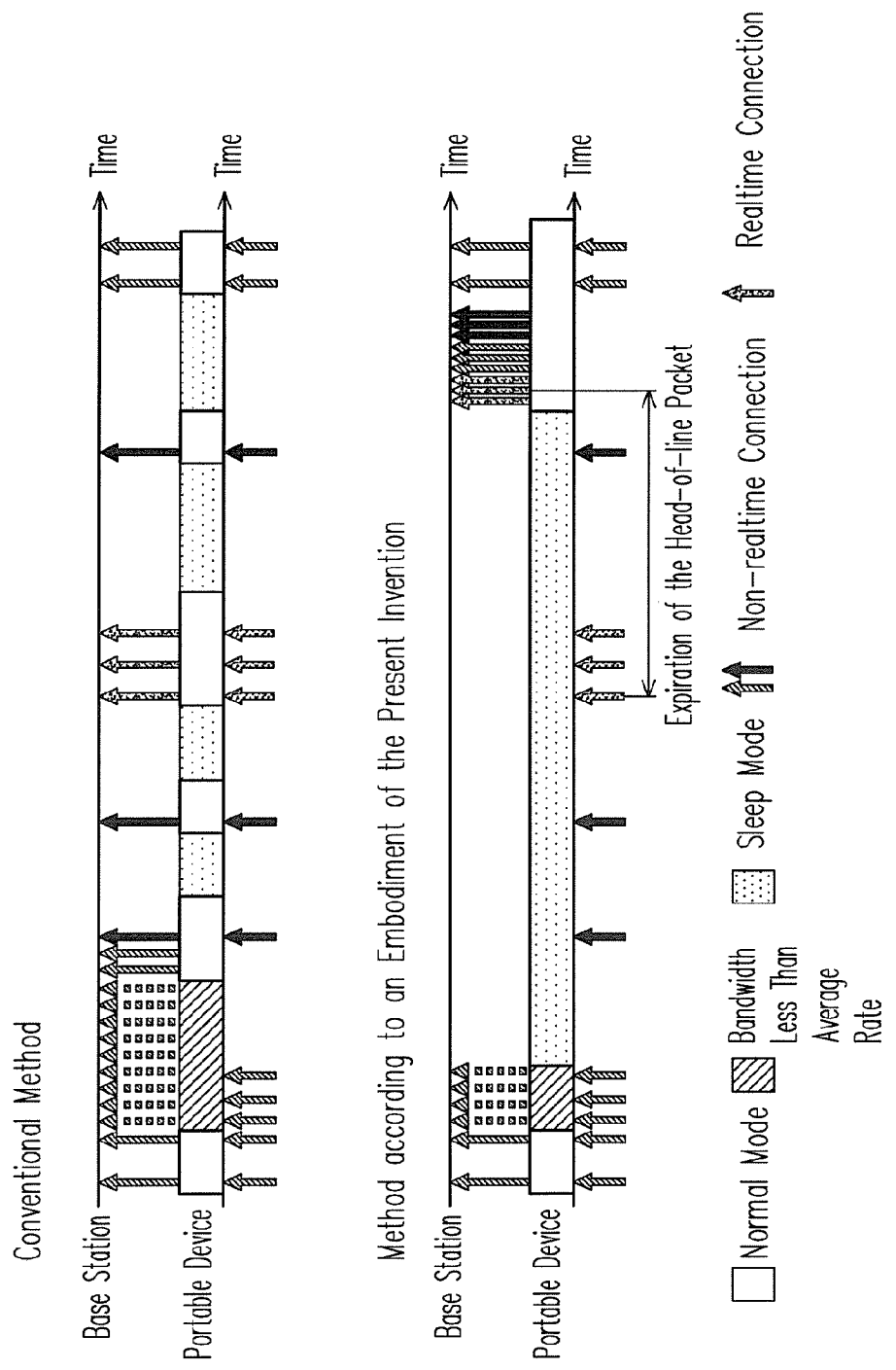
FIG. 4 illustrates a comparison between the determining method according to one exemplary embodiment consistent with the present invention and the conventional method.

FIG. 4 illustrates a comparison between the determining method for switching of the sleep mode according to one exemplary embodiment consistent with the present invention and the conventional method. Referring to FIG. 4, the present method and the conventional method are the same with respect to data transmission at the start in the normal mode. When the connection is non-realtime and the bandwidth granted to the portable device is less than its own average rate, the portable device can enter the sleep mode first by using the method of the present embodiment. In the sleep mode, if there is a non-realtime connection that requires data transmission, the data transmission can be held temporarily. However, if there is a realtime connection that requires data transmission, the HoL packet must be transmitted before the expiration of the HoL packet (HoLExpiration). When the realtime connection data is transmitted as the portable device enters the normal mode from the sleep mode, the non-realtime connection data that was held in the sleep mode can be transmitted together with the realtime connection data transmission.

On the other hand, if the conventional method is used, when the bandwidth granted to the portable device is less than its own average rate, the portable device is not allowed to enter the sleep mode unless the data transmission is completed. In the sleep mode, if there is a realtime connection that requires data transmission, the portable device must switch from the sleep mode to the normal mode for data transmission. From FIG. 4, it is apparent that the determining method for switching of the sleep mode of the present embodiment can effectively prolong the time for the sleep mode, thus avoiding the frequent mode switching and hence reducing the power consumption.

In summary, embodiments of the present invention can prolong the sleep time of the portable device and reduce the waste of network resources, thereby effectively increasing the use time of the portable device and performance of the network.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for determining switching of a sleep mode for a device, the device and a base station having at least one connection therebetween, the method comprising:
    providing one of the at least one connection;
    determining whether the connection is realtime or non-realtime;
    determining whether the connection satisfies the condition for entering the sleep mode based on a first condition if the connection is realtime, wherein the first condition comprises that:
        if a result of subtracting a maximum transmission time for the head-of-line packet and further subtracting a jitter from a remaining time for a head-of-line packet in a queue of the connection is greater than a determining period, the connection is then considered satisfying the condition for entering the sleep mode, wherein the remaining time is calculated by subtracting a current time from a sum of a time stamp of the head-of-line packet and a maximum latency of the connection, the maximum transmission time is calculated based on a size of the head-of-line packet and a minimum reserved traffic rate granted to the device by the base station, and the jitter is a latency variance in transmitting a packet from the device to the base station;
    determining whether the connection satisfies the condition for entering the sleep mode based on a second condition if the connection is non-realtime;
    the device entering a normal mode if the connection does not satisfy the condition for entering the sleep mode; and
    repeating the foregoing steps till the at least one connections have all been checked, and the device entering the sleep mode if all of the plurality of connections satisfy the condition for entering the sleep mode.

2. The method for determining switching of the sleep mode according to claim 1, wherein if the connection provided does not satisfy the condition for entering the sleep mode and the device is in the sleep mode, then the device switches into the normal mode.

3. The method for determining switching of the sleep mode according to claim 1, wherein if all of the plurality of the connections satisfy the condition for entering the sleep mode and the device is in the normal mode, then the device switches into the sleep mode.

4. The method for determining switching of the sleep mode according to claim 1, wherein the second condition is based on an average transmission rate of the device during a preset recent time period.

5. The method for determining switching of the sleep mode according to claim 4, wherein the second condition is also based on a total size of the overall data to be transmitted in a queue of the connection at a start time and a size of the remaining data to be transmitted in the queue of the connection at a current time, and the start time is prior to the current time.

6. The method for determining switching of the sleep mode according to claim 5, wherein the second condition comprises that:
if the result of subtracting the current time and further subtracting a maximum transmission time for the remaining data to be transmitted from a sum of the start time and an average transmission time for the overall data to be transmitted is greater than a determining period, the connection is then considered satisfying the condition for entering the sleep mode, wherein the average transmission time is calculated based on the size of the overall data to be transmitted and the average transmission rate, and the maximum transmission time is calculated based on the size of the remaining data to be transmitted and a minimum reserved traffic rate granted to the device by the base station.

7. The method for determining switching of the sleep mode according to claim 1, wherein the second condition is based on a recent bandwidth granted to the device by the base station.

8. The method for determining switching of the sleep mode according to claim 7, wherein the second condition comprises that:
the connection is considered satisfying the condition for entering the sleep mode if the bandwidth is less than a threshold.

9. The method for determining switching of the sleep mode according to claim 8, wherein the threshold is a preset constant.

10. The method for determining switching of the sleep mode according to claim 8, wherein the threshold is an average transmission rate of the device during a preset recent time period.

11. The method for determining switching of the sleep mode according to claim 8, wherein the threshold is an average value of a preset number of recent bandwidths granted to the device by the base station.

12. The method for determining switching of the sleep mode according to claim 7, wherein the second condition comprises that:
the connection is considered satisfying the condition for entering the sleep mode if a preset number of recent bandwidths granted to the device by the base station gradually decrease.

13. The method for determining switching of the sleep mode according to claim 1, further comprising:
if the device is in the normal mode, then setting a determining period to be a first preset value, and performing the method for determining switching of the sleep mode every the determining period; and
if the device is in the sleep mode, then setting the determining period to be a second preset value, and performing the method for determining switching of the sleep mode every the determining period.

14. The method for determining switching of the sleep mode according to claim 13, wherein the first preset value is greater than the second preset value.

15. A computer program product configured for performing the method for determining switching of the sleep mode according to claim 1.

16. A computer readable recording medium storing a program configured for performing the method for determining switching of the sleep mode according to claim 1.

* * * * *